May 25, 1954  H. C. SAVINO  2,679,355
COMPUTING AND INDICATING SYSTEM
Filed Jan. 4, 1952  3 Sheets-Sheet 1
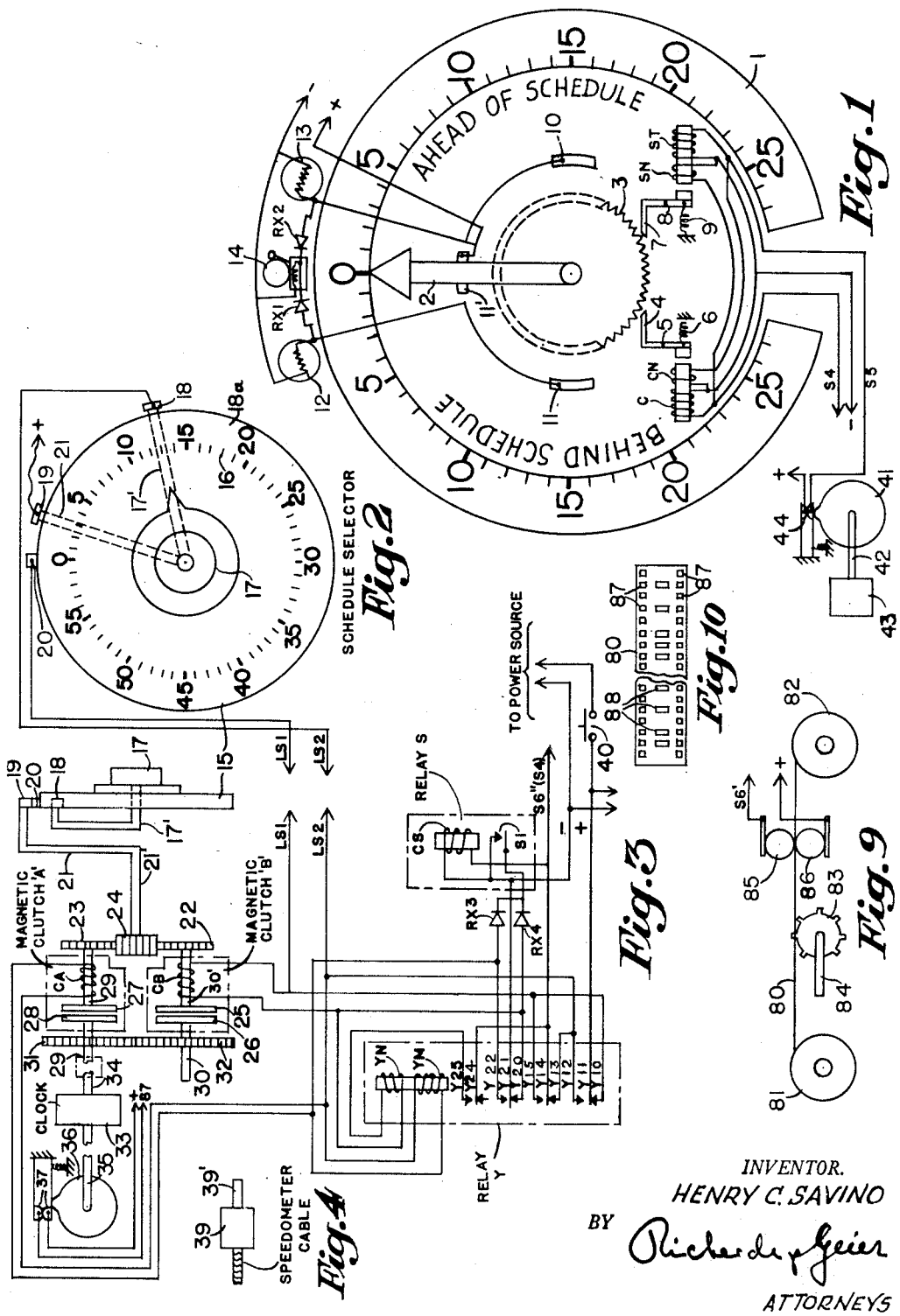
INVENTOR.
HENRY C. SAVINO
BY
ATTORNEYS May 25, 1954 H. C. SAVINO 2,679,355
COMPUTING AND INDICATING SYSTEM
Filed Jan. 4, 1952 3 Sheets-Sheet 2
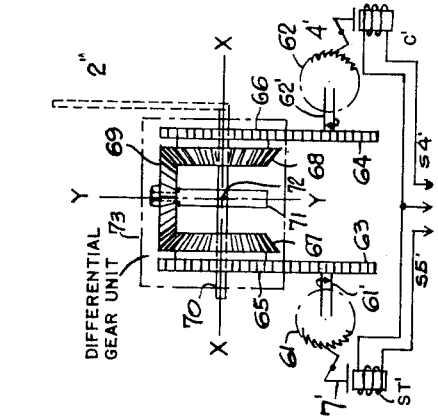
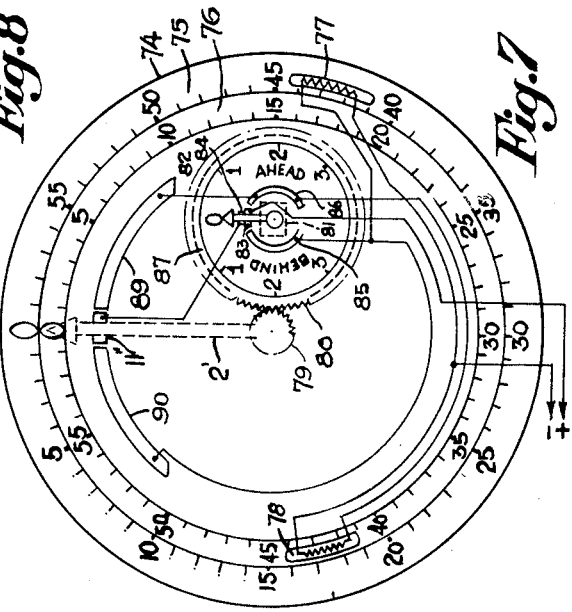
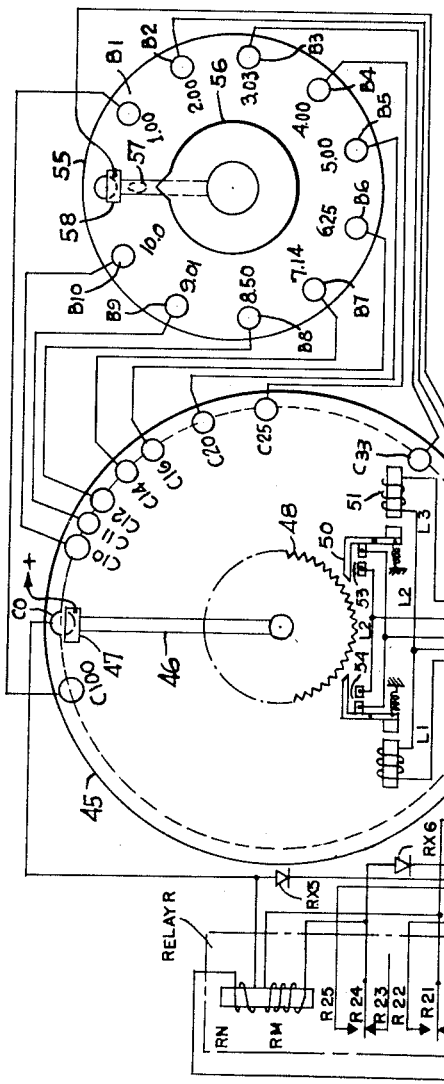
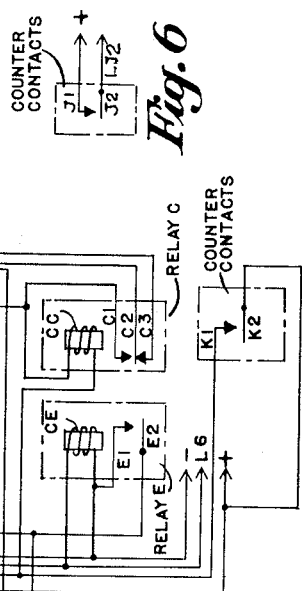
INVENTOR.
HENRY C. SAVINO
BY
*Richard Geier*
ATTORNEYS May 25, 1954   H. C. SAVINO   2,679,355
COMPUTING AND INDICATING SYSTEM
Filed Jan. 4, 1952   3 Sheets-Sheet 3

INVENTOR.
HENRY C. SAVINO
BY
ATTORNEYS

Patented May 25, 1954

2,679,355

UNITED STATES PATENT OFFICE 2,679,355

COMPUTING AND INDICATING SYSTEM

Henry C. Savino, Hackensack, N. J.

Application January 4, 1952, Serial No. 264,863

15 Claims. (Cl. 235—61)

This invention relates to computing and indicating systems and refers more particularly to a system for indicating deviations from a pre-set schedule.

An object of the present invention is the provision of a computing and indicating system which will automatically compute and indicate deviations of various machines or the like from a previously set schedule.

Another object of the present invention is the provision of a computing and indicating system which will compute deviations in the operation of various machines in relation to time, distance, production and percentage rejects of production.

Yet another object of the present invention is the provision of an automatically operable indicator which will continuously indicate the precise amount of deviation of a machine from a pre-set schedule.

A further object is the provision of an electrical impulse emitter which is so constructed that an easy and flexible schedule selection is made possible.

Yet another object of the present invention is the provision of a visual and audible system for informing a machine operator, supervisor, and the like, that a pre-determined critical off-schedule deviation point has been reached in the operation of such a machine.

A further object is the provision of a computing and indicating system operated by electrical impulses and which is so constructed that the accuracy of each operation is not affected by fluctuations in voltage and temperature.

A still further object of the present invention is the provision of a novel off-schedule computing and indicating system which is inexpensive in manufacture, simple in operation, flexible and easily adaptable to various conditions and requirements through the use of which schedule selection is made easy and extensive.

Other objects of the present invention will become apparent in the course of the following specification.

In attaining the objects of the present invention it was found desirable to provide an off-schedule indicator comprising one or more dials and a single hand movable over the dial. The dial is divided into one section which indicates "behind" schedule and another section showing that the machine in question is operating ahead of schedule. The hand is movable in opposite directions by impulses transmitted electrically from two different sources. One of these sources emits signals in accordance with pre-set and pre-determined schedules while the other source emits impulses according to an actual schedule. The hand on the dial indicates the difference between the two signals according to the equation:

$$SD = AS - PS$$

wherein

SD is the schedule deviation.
AS is the actual schedule.
PS is the pre-set schedule.

The impulses representing a pre-set schedule may originate by means of a clock, a tape provided with suitable perforations or by any other suitable mechanism. The actual schedule may be represented by impulses which emanate from the speedometer of a moving vehicle or from a counter actuated by machines in production and indicating the number of units produced, the number of rejects, and so forth. The indicator may be so constructed that it will show the actual deviation from a pre-determined allowable percentage of rejects. Suitable visual or audible signals may be utilized to indicate to an observer when the permissible limits have been exceeded.

The invention will appear more clearly from the following more detailed description when taken in connection with accompanying drawings showing by way of example preferred embodiments of the inventive idea.

In the drawings:

Figure 1 is a diagram showing an off-schedule indicator constructed in accordance with the principles of the present invention.

Figure 2 is a diagram illustrating the schedule selector used to select production and speed schedule.

Figure 3 is a diagram showing the electrical impulse emitter and the schedule selector associated therewith.

Figure 4 illustrates diagrammatically an attachment adapted for use in conjunction with the apparatus of Figure 3 and consisting of a speedometer gear unit and a cam switch used when the computing and indicating system is employed for indicating time deviations of a vehicle from a pre-set schedule.

Figure 5 illustrates a schedule selector and an impulse emitter associated therewith, of a somewhat different form, adapted to select schedules on a percentage basis.

Figure 6 is a diagram illustrating a set of electrical contacts which operate each time a production unit is rejected.

Figure 7 illustrates diagrammatically an indicating device of a different type which is particularly suitable when deviations on a large scale are to be indicated.

Figure 8 illustrates diagrammatically an indicator capable of operating in conjunction with a differential gear unit.

Figure 9 is a diagram illustrating a perforated tape unit which may be used as a substitute in accordance with the present invention.

Figure 10 is a front view illustrating in detail the perforated tape of Figure 9.

Figure 11:
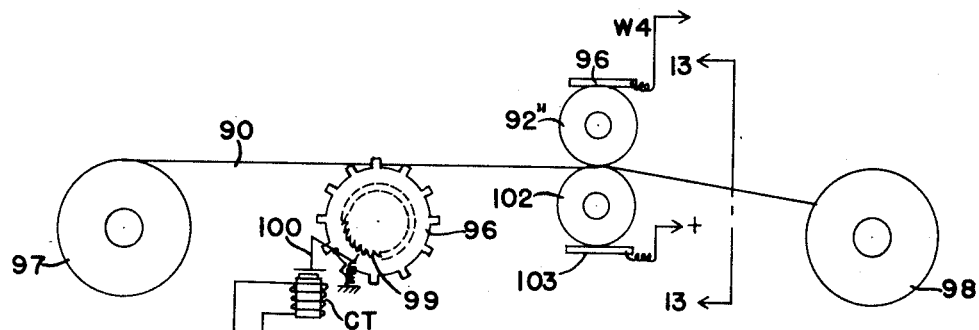
Figure 11 is a diagram illustrating an apparatus having several reject characteristics.

As already stated, the apparatus shown in Figures 1, 2 and 3 of the drawings operate to indicate a schedule deviation which is the difference between actual schedule and pre-set schedule.

The indicator showing the deviation is illustrated in Figure 1 and consists of a single dial 1 divided into a "behind" schedule portion and an "ahead" schedule portion. In the example illustrated, the "behind schedule" portion occupies the left half of the dial (looking in the direction of Figure 1) while the "ahead schedule" portion occupies the right half of the dial. A clocklike hand 2 sweeps over both halves of the dial 1.

The hand 2 is firmly connected to a gear wheel 3. The wheel 3 is moved stepwise, counter-clockwise by means of a pawl 4 which is pivoted at 5 and which is held in its retracted position by means of spring 6. The pawl 4 is actuated by a coil C. It is apparent that when the coil C is actuated, the pawl 4 will be swung about its pivot 5 and will move counter-clockwise the wheel 3 and the hand 2 connected therewith. A second pawl 7 is located opposite the pawl 4 and is used to move the hand wheel 3 and the hand 2 connected therewith in the opposite direction, namely clockwise. The pawl 7 is pivoted at 8 and is held in the retracted position by the spring 9. The pawl 7 is actuated by the coil ST. In the example illustrated the hand 2 is therefore actuated counter-clockwise by impulses due to the pre-determined schedule and is actuated clockwise by impulses due to the actual schedule. It is apparent that this arrangement may be reversed whenever this is desirable.

A neutralizing coil CN is connected in parallel with a coil ST while a neutralizing coil SN is connected in parallel with a coil C. It is apparent that the coil CN has the effect of neutralizing the coil ST. The neutralizing coils CN and SN are used to neutralize the coils C and ST when the impulses caused by the predetermined schedule and by the actual schedule occur simultaneously. It is apparent that in the absence of the neutralizing coils the pawls 4 and 7 will endeavor to move the wheel 3 simultaneously in opposite directions with the resulting strain upon the structure.

This strain is eliminated by the neutralizing coils CN and SN since due to their provision only the difference between the impulses caused by the pre-determined schedule and by the actual schedule is transmitted to the wheel 3 and the hand 2. Thus, when a series of electrical impulses produced by the predetermined schedule exceeds the series of impulses produced by the actual schedule, the hand 2 will move counter-clockwise a number of steps which is equal to the difference between the two series of impulses. On the other hand, when the series of impulses produced by the actual schedule exceeds the series of impulses produced by the pre-set schedule, the hand 2 will move stepwise, clockwise, the number of steps being equal to the difference between the two series of impulses.

At times it may be desirable to provide either in the vicinity of the indicator, Figure 1, or at a remote point thereof, a visual and audible warning system which is set in operation when a predetermined maximum deviation from a pre-set schedule has been reached. The visual system is provided by the lamps 12 and 13 while the sound system is indicated by the bell or buzzer 14. The lamp 12 is electrically connected with a segment or contact 11 located upon the dial 1 in a position which corresponds to the maximum allowable "behind schedule" point. The lamp 12 may be of red color. A contact 11¹ is carried by the hand 2 and is adapted to engage the contact 11 at the maximum allowable "behind schedule" point. When the two contacts are engaged an electrical circuit will be established which will light the lamp 12.

A contact 10 is located upon the section of the dial 1 which is indicated as "ahead" schedule, and the location of the contact 10 corresponds to the maximum allowable "ahead of schedule" point. It is apparent that when the hand 2 is moved to the position corresponding to the allowable "ahead of schedule" point, the contact 11¹ will engage the contact 10, thereby providing the flow of an electrical current which will illuminate lamp 13. The lamp 13 may be of green color. The bell 14 is operatively connected with the lamps 12 and 13 through the medium of blocking rectifiers RX1 and RX2. It is apparent that the blocking rectifiers are utilized to prevent the energization of the lamp 13 when the lamp 12 is energized and also to prevent energizing the lamp 12 when the lamp 13 is energized. The brush 11¹ may be connected by any suitable means indicated diagrammatically in the drawings to the positive side of a source of electrical energy, while the lamps 12 and 13 and the bell 14 may be connected to the negative side of the same source of electrical energy.

Figures 2 and 3 of the drawings illustrate the means producing impulses caused by the pre-set schedule and the actual schedule which are thereupon transmitted to the indicator shown in Figure 1.

It is apparent that the aggregate illustrated in Figures 1, 2, 3, 4 and 5 may be utilized to indicate deviations of production, time and production rejects. When the computer of the present invention is used to indicate off-schedule production it must take into account the elapsed time, the scheduled time per unit of production, and the actual number of units produced to give the off-schedule production in terms of units.

Figure 2 of the drawings illustrates a schedule selector having a dial 18a provided with a schedule 16, divided "0" to "60." In the example illustrated, the scale 16 is calibrated to represent 60 seconds. It is apparent, however, that any other calibration can be utilized.

A hand or arm 17¹ is movable over the dial 18a and is firmly connected to a disk 17. The arm 17¹ carries a contact 19 which is attached to a line LS2. A contact 20 is located opposite the "0" position of the scale 16 and is attached to the line LS1. Preferably the contact 20 is immovably mounted in this position. An oscillating arm 21 is mounted over the scale 16 and is provided with a contact 19 which may be attached by any suitable means to the positive side of an electrical source of energy. As shown in Figure 3, the arm 21 is firmly mounted upon a shaft 21¹. A gear 24 is keyed upon the shaft 21¹ so that the gear 24 moves along with the arm 21. The gear 24 meshes with the gears 23 and 22. The gear 23 is carried upon a shaft 29¹. A magnetic clutch A is connected with a shaft 29¹. The clutch A includes a clutch plate 27 and an electric coil CA. The other plate 28 of the magnetic clutch is connected with a shaft 29 and a gear 31 mounted upon the shaft 29.

Similarly, the gear 22 is carried by the shaft 30¹ which is connected with a magnetic clutch B. The clutch B includes a plate 25 and a coil CB for operating the clutch. The plate 25 cooperates with the second plate 26 of the clutch B which is connected to a shaft 30. A gear 32 meshing with the gear 31 is mounted upon the shaft 30.

The pre-set impulses are produced by a clock 33 which is connected to the shaft 29 by a coupling 34.

It is apparent that when the electrical current flows through the coil CA, the magnetic clutch A will be energized, thereby connecting the plates 27 and 28. Then the clock 33 will be operatively connected with the arm 21 through the coupling 34, the shaft 29, the plates 28 and 27, the shaft 29¹, the gear 23, the gear 24, and the shaft 21¹. Thus the motion of the clock 33 will tend to move the arm 21 in one direction.

The magnetic clutch B is energized when an electrical current flows through the coil CB. Then the plates 25 and 26 will be joined, with the result that the shaft 30 and the gear 32 mounted thereon will be connected with the arm 21 through the plates 26 and 25, the shaft 30¹, the gears 22 and 24, and the shaft 21¹. As already stated, the shaft 29 carries the gear 31 which meshes with the gear 32. It is thus apparent that when the magnetic clutch A is disengaged, while the magnetic clutch B is engaged, the clock 33 will rotate the arm 21 in the opposite direction. It is further apparent that if the clutches A and B are energized consecutively, the arm 21 will oscillate back and forth over the scale 16.

The apparatus of Figure 3 includes a relay Y which is used to control the action of magnetic clutches A and B and consequently of the rotary arm 21. The relay Y is also used to transmit impulses caused by the pre-set schedule to the stepping coil C of Figure 1.

The relay Y is a 4-pole, double-throw relay which includes contacts Y10 to Y15, Y20, Y21 and Y22, Y24 and Y25, as well as coils YM and YN. In the position illustrated, the relay Y is de-energized. Then the contacts Y10—Y11, Y13—Y14, and Y20—Y21 are closed while the contacts Y11—12, Y14—Y15, Y21—Y22, and Y24—Y25 are open.

It is apparent that when the relay Y is energized, the above-described closed contacts will open while the open contact will be closed.

The coil YM is the energizing coil which is used to close the relay Y. It is apparent that this coil YM is connected with the coil CA of the clutch A. The coil YN is used as the de-energizing coil which switches off the relay Y. The magnetic effect of the coil YN is opposed to that of coil YM.

The apparatus shown in Figure 3 also includes a relay S which contains a coil CS connected to the negative side of a source of electrical energy and to a conduit S6 which is connected to the conduit S4. The relay S also includes contacts S1 which are connected to blocking rectifiers RX3 and RX4. The latter are connected to the contacts Y22 and Y20, respectively. The relay S is utilized to make certain that the impulses produced by the pre-set schedule will operate the stepper coil C of the indicator shown in Figure 1 before energizing and de-energizing the relay Y.

Let it be assumed now that the production schedule calls for one article or unit production to be produced every 15 seconds. Then the operator must turn the dial 17 with its arm 17¹ to the numeral 15 upon the scale 16. Since the arm 17¹ is connected with the member 17, the contact 18 will be positioned opposite the numeral 15. The arm 21 will be located initially in a position in which it points to 0 upon the scale 16 so that the contact 19 of the arm 21 will be in engagement with the contact 20 which is permanently located opposite the 0-position. Then the operator depresses the pushbutton 40, to start the operation. Thereupon an electrical circuit is formed from the plus side of the line to the contacts Y11 and Y12, the coil CB of the clutch B, the contacts Y20 and Y21, and the negative side of the supply line. Thus the clutch B will be energized by the coil CB so that the movement of the clock 33 will be transmitted to the arm 21 through the shaft 29, the gears 31 and 32, the plates 26 and 25, the shaft 30¹, the gears 22 and 24, and the shaft 21¹. The arm 21 will thereupon move clockwise over the scale 16. Since the scale 16 will be calibrated in seconds in this example, at the end of the 15 seconds the arm 21 will move over the arm 17¹, and the contact 19 of the arm 21 will be brought in engagement with the contact 18 of the arm 17¹. This engagement of the contact 19 with the contact 18 will result in the following circuits:

The stepping coil C of the indicator of Figure 1, along with its wire S4, will be energized since, as already stated, the wire S4 is connected to the wire S6. The circuit leading to the coil C will include the plus side of a supply line, the contacts 18 and 19, the line LS2, contact Y13 and Y14, the line S6, the line S4, coil C, and back to the negative side of the supply line.

The coil C, after being energized, will swing the pawl 4, and this movement of the pawl 4 will turn the wheel 3 and the hand 2 connected therewith one step counter-clockwise over the scale 1.

Since the coil CS of the relay S is connected to the line S6 and to the negative side of the supply line, the relay S will also be energized, with the result that the contacts S1 will be closed.

Thereupon the magnetic coil CA of the magnetic clutch A will be energized by way of the positive side of a power source, the contacts 18 and 19, the line LS2, the coil CA, the blocking rectifier RX3, contact S1 and the negative side of the power source. It is apparent that temporarily the clutches B and A will be energized at the same time. This is required in order that the clutch plate 27 of the clutch may move towards the plate 28 before the clutch B is deenergized, thereby preventing lost motion. The parts are so arranged and the timing is such that when the clutch plates 27 and 28 of the clutch A are brought into engagement, the plates 25 and 26 of the clutch B will be disengaged.

The coil YM of the relay Y will also be energized as the result of a circuit which includes the plus side of a source of power, the contacts 19 and 18, the line LS2, the coil YM, the blocking rectifier RX3, contacts S1, and the negative side of the same source of power. As a result of the energization of the relay Y, the contacts of the relay shown as being closed in Figure 3, will open while the open contacts will close.

As a result of the energization of the relay Y the magnetic clutch B will become de-energized since the contacts Y10—Y11, and Y20—Y21, will open. However, the coil YM will continue to remain energized, due to the provision of a holding circuit which includes the positive side of a power source, the contacts Y11—Y12, the coil YM, the contacts Y21—Y22 (which are now closed), and the negative side of the power source.

The coil CS of the relay S of Figure 3 and the stepper coil C of the indicator of Figure 1 become both de-energized when the contacts Y13 and Y14 open. As a result of the deenergization of the coil C, the stepper pawl 4 will be returned by the spring 8 to its original inoperative position shown in Figure 1.

It is apparent that the magnetic clutch A is now energized while the clutch B is de-energized. Thus the clock 33 will be connected with the arm 21 through the shaft 29, the gears 23 and 24, and the shaft 21¹. Therefore the arm 21 will now move counter-clockwise.

It is further apparent that this action of reversing the direction of movement of the arm 21 takes place very rapidly so that the time lost as a result of this reversal is negligible in most cases. However, the time lost on the average can be easily determined and allowance can be made for the time lost through appropriate graduations of the scale 16. Thus the accuracy of the operation will be assured.

At the end of the counter-clockwise movement of the arm 21 it will reach the 0-position, and the contact 19 will again engage the contact 20. Then the following circuit will be established:

The coil C of the indicator 1 will be energized again by a circuit which includes the plus side of a source of power, the contacts 19 and 20, the line LS1, contacts Y15 and Y14, line S3, line S4 connected therewith, the coil C, and the negative side of the source of power. Due to the energization of coil C the pawl 4 will again be actuated and will turn the wheel 3 and the hand 2 connected therewith one step counter-clockwise, in the same manner as previously described.

The relay S will be energized again, by means of the previously described circuit.

The clutch B will be energized as the result of an electrical circuit which includes the coil CB of the clutch and which comprises the positive side of a power source, contacts 19 and 20, line LS1, coil CB, blocking rectifier RX4, contacts S1, and the negative side of the power source.

In this case also the two magnetic clutches A and B are temporarily energized at the same time so that the plate 25 of the clutch B can move into engagement with the plate 26 before the clutch A is de-energized. The timing is such that when the clutch plates 25 and 26 of the clutch B are engaged, the clutch plates 27 and 28 are disengaged.

The relay Y becomes inoperative at that time since its neutralizing coil YN is energized by an electrical circuit which includes the plus side of a power source, contacts 19 and 20, line LS1, contacts Y15 and Y14, contacts Y24 and Y25, coil YN, rectifier RX4, contacts S1 and the negative side of the power source.

As soon as the relay Y becomes inoperative, these contacts are moved back to the position shown in Figure 2. Thereupon the coil CB of the magnetic clutch B becomes energized once more while the coil CA of the magnetic clutch A is now de-energized.

When the contacts Y15 and Y14 open, the coil CS of the relay S and the coil C of the indicator shown in Figure 1 become de-energized.

The magnetic clutch B is now energized while the magnetic clutch A is de-energized. Then the arm 21 moves again clockwise from the 0-position to the position "15" on the scale 16, and thus the cycle is repeated.

It is thus apparent that the impulses of the pre-set schedule are produced by means of the clock 33 and are used to move the hand 2 counter-clockwise.

The impulses caused by the actual schedule are produced by the contacts 44 of Figure 1. These contacts are closed and opened by a cam 41 which is mounted upon the shaft 42. The shaft 42 is connected to any suitable production machine 43 which is illustrated diagrammatically in the drawing.

When the contacts 44 close, the stepper coil ST of the indicator shown in Figure 1 will be energized by an electrical circuit which includes the plus side of a source of power, the contacts 44, line S5, coil ST, and the negative side of the same source of power. When the coil ST is energized, the pawl 7 will be attracted and will swing toward the coil, thereby moving the stepper wheel 3 and the hand 2 connected therewith one step clockwise.

As soon as the contacts 44 open, the coil ST will become de-energized, and the pawl 7 will be returned to its original position by the spring 9. The cam 41 is arranged to close and open the contacts 44 in such manner that the impulses received by the coil ST are of the same duration as the impulses received by the coil C.

It is thus apparent that every time a unit of production is completed the coil ST may receive one impulse, to move the hand 2 one step clockwise.

As far as the equation $SD = AS - PS$ is concerned, it is apparent that the indicator 1 is operated to show directly the difference between the pre-set schedule and the actual schedule.

The computer illustrated in Figures 1, 2, and 3 may also be used to indicate time deviations from predetermined operational schedules, such as a schedule for operating or showing the movement of trains, buses, or other vehicles. Such operational schedule takes into account the elapsed time, the distance traveled, and the pre-set speed schedule. In accordance with the present invention, the mechanism shown in Figures 1, 2 and 3 may be combined with mechanical elements shown in Figure 4, to show directly the deviations from a pre-set operational schedule.

In the equation $SD = AS - PS$ it is apparent that $$AS = \frac{DT \times 60}{SS}$$

AS represents the time that the vehicle has actually traveled according to a scheduled speed. PS represents the time that the vehicle should have traveled at the pre-set speed, DT is the time deviation and SS is the scheduled speed. If both parts of the equation are multiplied by the factor $K$, the equation will be $$SD = \frac{\left(\frac{DT}{SS} \times 60\right) \times K - (ET) \times K}{K}$$

In this equation $SD$ is the schedule deviation in minutes. $SS$ is the schedule speed in miles per hour. $ET$ is the elapsed time in minutes, and $K$ is the basic electrical impulse rate per minute which is based upon the smallest division marked on the dial 1 of the indicator of Figure 1, and representing the smallest time unit.

The result of the above equation is represented directly upon the indicator of Figure 1. The impulses due to $ET$ are produced by closing and opening the contacts 37 shown in Figure 3, at a uniform rate per minute. The contacts are actuated by a cam disk 36, connected to a shaft 35. The shaft 35 is coupled by any suitable means to the shaft 34, carrying the clock 33. Thus the clock mechanism 33 is directly connected to the cam disk 36 so that the contacts 37 will close and open at a uniform rate of speed, depending upon the selected factor $K$. If the smallest division on the dial 1 of the indicator, shown in Figure 1, is 1 minute, then $K$ equals 1, so that the contacts 37 will close and open once every minute.

On the other hand, if the smallest division desired is ½ minute, then the factor $K$ equals 2, and the contacts 37 will be closed and opened twice every minute.

In the example illustrated $K$ equals 1 so that the contacts 37 close and open once every minute by the clock 33. The closing of the contacts 37 will energize the stepper coil C (Figure 1), by means of an electrical circuit which includes the positive side of the power supply, contacts 37, line S7, line S4—which is now connected to the line S7—coil C, and the negative side of the source of electrical power. As soon as the coil C is energized, the pawl 4 will be attracted and will engage the wheel 3, turning the wheel 3 and the hand 2 connected therewith one step counter-clockwise. It is apparent that the hand 2 will be stepped counter-clockwise over the dial 1 at the rate of one step per minute.

The closing and the opening of the contacts 37 takes place at a very rapid rate so that the duration of the impulse is the same as that of the impulses emitted by the selector of Figure 2 which was previously described.

By way of illustration let it be assumed that a vehicle is scheduled to travel at a speed of 30 miles per hour. The distance-actuated impulses, which are equal to $DT$ divided by $SS$, multiplied by 60, are produced by connecting the speedometer cable 38 shown in Figure 4, to the impulse emitter unit of Figure 3 by means of the gear reduction unit 39 and the shaft 39¹ which is connected to the shaft 30 by any suitable means. The shaft 30 carries a gear 32, as previously described. Thus the speedometer cable 38 is now connected to the schedule selector mechanism so that the oscillating arm 21, shown in Figures 2 and 3, is now moved by the motion of the vehicle transmitted by the speedometer cable 38. Let it be assumed that the speedometer cable 38 rotates at the rate of 1000 revolutions per mile of travel and that the schedule selector has a speed range varying between 0 and 60 miles per hour. In that case the gear reduction of the member 39 of Figure 4 will be 1000:1, this being based upon the $K$ factor of 1. If $K$ equals 2, the gear ratio of the apparatus 39 would have to be 500:1. In the described illustration the oscillating arm 21 moves to the extent of 360° per each mile traversed by the vehicle. Therefore the factor $$\frac{DT}{SS}$$

can also be expressed in degrees with the number of miles traveled, which is equal to $DT$, multiplied by 360°, and with the schedule speed $SS$ being expressed in the number of degrees that the member 17 (Figure 2) is rotated in selected the speed. When $$\frac{DT}{SS}$$

is expressed in degrees, the factor "60" in the equation is eliminated so that the equation reads as follows:

$$SD = \frac{\left(\frac{DT}{SS}\right) \times K - (ET) \times K}{K}$$

As already stated in the assumed example, the member 17 of the schedule selector of Figure 2 is rotated to a position showing the 30 miles per hour speed, or 180° from the 0 position. Then the arm 21 will swing back and forth between the contacts 18 and 20 in the manner described. For every mile of travel the arm 21 moves between the contacts 18 and 20 for a total of 360° and at the same time two electrical impulses are emitted by the schedule selector to the stepper coil ST of the indicator of Figure 1, to move the hand 2 clockwise in the previously described manner.

Thus, when the schedule selector is set for thirty miles per hour, the arm 21 will rotate to the extent of 180° and then reverse. At a speed of fifteen miles per hour the arm will rotate 90° before it reverses.

Every time the contact 19 engages the contacts 18 or 20, one impulse will be emitted to the stepper coil ST of the indicator of Figure 1.

While at the rate of thirty miles per hour two impulses are emitted for each mile of travel, at the rate of fifteen miles per hour, four impulses must be emitted to compensate for the impulses produced by the cam switches 37.

An examination of the equation $$SD = \frac{\left(\frac{DT}{SS} \times 60\right) \times K - (ET) \times K}{K}$$

shows that if at the end of fifteen miles twenty-five minutes have elapsed, and if the scheduled speed is thirty miles per hour, the formula will become $$SD = \frac{\left(\frac{15}{30} \times 60\right) \times 1 - 25 \times 1}{1} = +5 \text{ minutes}$$

The same equation, when set forth in degrees, is as follows:

$$SD = \left(\frac{15 \times 360}{180}\right) \times 1 - 25 \times 1 = +5 \text{ minutes}$$

The vehicle is ahead of schedule to the extent of five minutes and the indicator hand 2 of Figure 1 will be stepped clockwise to the numeral "5" on the dial 1, to show that the vehicle is ahead by five minutes.

It is apparent from the above equation that the distance-actuated impulses $$\frac{DT}{SS}$$

amount to 30 while the clock-actuated impulses ET are equal to 25, plus the difference of five impulses transmitted by the coil ST to step the hand 2 clock-wise five times.

Let it be assumed that at the end of thirty miles the time elapsed is seventy minutes; the equation will then read as follows:

$$SD = \frac{\left(\frac{30 \times 360}{180}\right) \times 1 - 70 \times 1}{1} = -10 \text{ minutes}$$

Thus the vehicle is then behind schedule to the extent of ten minutes, and the hand 2 of the indicator of Figure 1 has been stepped ten times counter-clockwise, to indicate that the correct position is ten minutes behind schedule. The number of impulses emitted by the impulse unit of Figure 3 to the coil ST is equal to sixty while the number of impulses emitted by the switches 37 and transmitted to the coil C of Figure 1 are equal to seventy, the difference being minus ten.

The computer of the present invention may be utilized to indicate off-schedule rejects for use in industrial production. Then the computer takes the percentage of the allowable reject level into account, the amount of production units inspected, and the actual number of units rejected. The indicator will give an indication of the number of units ahead or behind a pre-set reject level. Since the indicator gives continuous direct indications, a supervisor or foreman will be able to take immediate corrective steps when the rejects are in excess of a pre-set reject level.

In the equation previously set forth, $$SD = AS - PS$$

AS represents the actual number of units rejected while PS represents the pre-set percentage of allowable rejects. The term PS is equal to AP times UI, where AP is the allowable percentage, while UI is the number of units inspected. Then the equation becomes $$SD = AS - (AP \times UI)$$

As in the previously described example, this equation is embodied into an apparatus wherein it is represented by electrical impulses.

The impulses due to AS are produced by suitable rejects countercontacts J1 and J2, shown in Figure 6, which may be temporarily closed by push buttons, photo-electric circuits, or any other known suitable means. The contacts J1 and J2 are closed every time a production unit is rejected because it does not meet inspection specifications.

When the computer is utilized for this purpose, the line LJ2 of Figure 6 is directly connected to the line S5 of Figure 1 so that when the contacts J1 and J2 are closed, the stepper coil ST of Figure 1 is energized by a circuit which includes the positive side of a source of power, contacts J1—J2, line LJ2, line S5, coil ST, and the negative side of the same source of electrical energy. As soon as the stepper coil ST is energized, the pawl 7 will be actuated and will move the wheel 3 and the hand 2 connected therewith clockwise in the previously described manner. When the apparatus is used for this purpose, the lamp 13 may be red in color while the lamp 12 may be green.

The impulses representing the pre-set allowable percentage (AP times UI) are emitted by the apparatus shown in Figure 5 of the drawings. This apparatus included a schedule selector 55, a stepper switch 45, relays R, CE and CC and countercontacts K1 and K2.

The schedule selector 55 has a dial upon which contacts B1 to B10, inclusive, are arranged. These contacts are arranged in a circle and are used to represent allowable reject percentages, ranging from 1 to 10. A dial 56 is located in the center of the device 55 and may be rotated to select a pre-set reject schedule. The dial 56 is firmly connected to an arm 57 which rotates, along with the member 56. A brush 58 is attached to the arm 57 in such position that it can move over any one of the contacts B1 to B10. The stepper 45 has a dial and a toothed stepper wheel 48 which is located in the center thereof and which carries an arm 46. The arm 46 is firmly connected to the wheel 48 and is movable therewith. The wheel 48 is actuated in one direction by a pawl 49 while a pawl 50 moves it in the opposite direction. The pawl 49 is pivoted intermediately its ends and is attracted by a coil 52. The pawl 50 is pivoted in a similar manner and is attracted by a coil 51. Two contacts 54 are located close to the pawl 49 in such position that the pawl 49 closes the contacts 54 when the pawl 49 is attracted by the coil 52 and is moved to engage the wheel 48. Similarly, contacts 53 are closed by the pawl 50 when the latter is moved by the coil 51 to engage the wheel 48.

The brush 47, which is carried by the arm 46, is connected to the plus side of a source of electrical energy. The brush or contact 47 may be moved into engagement with a number of contacts located on the dial of the instrument 45 and designated as C10, C11, C12, C14, C16, C20, C25, C33, C50, and C100, in Figure 5.

As shown in Figure 5, these contacts are electrically connected with the contacts B1 to B10 of the instrument 45. The contact C10 is located ten steps to the right (looking in the direction of Figure 5) of the contact C0 so that the brush 47, carried by the arm 46, will engage the contact C10, after the arm 46 has been stepped clockwise 10 steps. The contact C11 is located 11 steps to the right of the contact C0, while the contact C12 is located 12 steps beyond the contact C0. Similarly, the contact C14 is located 14 steps away; the contact C16, 16 steps away; the contact C20, 20 steps away; the contact C25, 25 steps away; the contact C33, 33 steps away; the contact C50, 50 steps away, and the contact C100 is located 100 steps beyond the contact C0. As already stated, the contact C10 is electrically connected to the contact B10 which represents a schedule of 10% rejects. The contact C11 is connected with B9 and represents 9.1%, and so forth.

The relay R is a 4-pole, double-throw, telephone type relay, and it includes a main coil RM, used to actuate the relay. The relay is neutralized by the neutralizing coil RN. The relay includes contacts R10, R11, R12, R13, R14, R15, R21, R22, R24, and R25. Figure 5 shows the relay R in its inoperative position in which the contacts R10—R11 and R13—R14 are closed while the contacts R11—R12, R14—R15, R21—R22, and R24—R25 are open. When the relay R is made operative by the energization of the coil RM, the closed contacts will open while the open contacts will close.

The apparatus also includes a relay E, comprising the energizing coil CE connected to contacts R13. The energizing coil CE is used to actuate contacts E1 and E2 connected to the contact R25. A relay C includes an energizing coil CC which is used to actuate contacts C1, C2, and C3. It is apparent that the relay E is made operative by energizing the coil CE which will cause the contacts E1 and E2 to close. The relay C is made operative by energizing the coil CC which closes the contacts C2, C1, and opens the contacts C3, and C2.

The apparatus also includes countercontacts K1—K2 which are temporarily closed, every time a production unit is brought for inspection. Any suitable means can be used to close these contacts, such as push buttons, mechanical means, or photo-electric circuits. Every time contacts K1—K2 close, the stepper coil 52 or the stepper coil 51 will be energized in the following manner:

Let it be assumed that for a certain production line the normal number of rejects is 10% so that anything above 10% is not to be allowed. Then the schedule selector dial 56 is rotated to the 10% position in which the brush 58 is in engagement with the contact B10. The arm 46 is also assumed to be in the 0-position in which the contact 47 is in engagement with the contact C0.

Every time a production unit is brought for inspection, contacts K1 and K2 are momentarily closed and the stepper coil 51 is energized by means of a circuit which includes the plus side of the line, the contacts K2 and K1, the contacts R10, R11, and line L3, the coil 51, the line L2, contacts C3 and C2, and back to the negative side of the line. In view of the energization of the coil 51, the pawl 50 will be attracted, and the gear wheel 48 as well as the arm 46 carried thereby, will be moved one step clockwise.

It is apparent that the relay CC will operate at the same time but without performing any useful work. After ten production units have been brought up for inspection, namely after the contacts K1 and K2 were closed and opened ten times, the wheel 48 and the arm 46 will be moved stepwise ten times clockwise, and at that time the brush 47, carried by the arm 46, will be moved into contact with the contact C10 upon the dial 45. As a result of the interengagement of the contacts 47 and C10, the following will take place:

The coil C of Figure 1 will receive an electrical impulse due to the creation of an electrical circuit, which includes the positive side of the line, the brush 47, the contact C10, the contact B10, which is connected with the contact C10, the brush 58, the rectifier RX7 connected to the brush 58, the contacts R13 and R14, the line L6, the line S4 (Fig. 1) which is connected to the line L6, the coil C of the apparatus 1, and the negative side of the line. Then the hand 2 of Figure 1 will be moved one step counter-clockwise. At the same time, the coil CC (Fig. 5) will be energized as the result of an electrical circuit which includes the positive side of the line, contacts K1 and K2, the coil CC, contacts 53, and then the negative side of the line.

Due to the energization of the coil CC, the contacts C3 and C2 will open while the contacts C2 and C1 will be moved into engagement with each other. As a result of the closing of the contacts C2 and C1, the coil CC will remain energized although the contacts 53 will be open.

The opening of the contacts C3—C2 will open the common return to the negative line of the power supply of the stepper coils 51 and 52. Due to this arrangement no reversal of the direction of the arm 46 can take place while the contacts K1 and K2 are closed. Without this provision an incorrect movement of the arm 46 in the opposite direction could occur.

Furthermore, due to the engagement of the brush 47 with the contact C10, the coil CE of the relay E will be energized and will close the contacts E1 and E2. This will take place in view of the fact that the coil CE is connected to the line L6 and to the negative side of the power line.

The relay E is thus energized and this makes sure that an impulse will be emitted to the stepper coil CN of Figure 1 before the relay R is made operative and then inoperative.

The relay R becomes operative since the coil RM is energized as a result of an electrical circuit which includes the plus side of the source of electrical energy, the brush 47, contact C10, contact B10, brush 58, the coil RM, rectifier RX6, contacts E1 and E2, and the negative side of the source of electrical power. Then the contacts of the relay R, shown open in Figure 5, will close, and the closed contacts will be opened.

As a result of the closing of the contacts R21—R22 and the contacts R24—R25, the positive and the negative sides of the power source will be connected directly to the coil RM so as to provide a holding circuit. The contacts R13—R14 will open and thus the coils CE and C will be de-energized. The contacts R10—R11 will open the circuit of the stepper coil 51. On the other hand, the contacts R11—R12 will close to form a circuit, including the coil 52. Therefore on the next impulse resulting from closing of the contacts K1 and K2, the arm 46 will move counter-clockwise.

It is thus apparent that the circuits are now set up in such manner that when the contacts K1 and K2 are closed momentarily, the stepper coil 52 will become energized by means of a circuit which includes the plus side of the line, the contacts K1—K2, contacts R11—R12, line L1, coil 52, line L2, contacts C3—C2, and the negative side of the power source. Then the stepper coil 52 will attract the stepper pawl 49 and cause it to engage the toothed wheel 48, as a result of which the arm 46 will move one step counter-clockwise.

The relay C will be operated in the previously described manner.

After 10 more production units have been brought up for inspection, and the contacts K1—K2 have been brought 10 times in and out of engagement, the arm 46 will move counter-clockwise 10 steps so that the brush 47, carried by the arm 46, will be moved back into engagement with the contact C0. As soon as the brush 47 engages the contact C0, the following operations will take place:

One more impulse will be emitted to the stepper coil C of the apparatus 1 (Fig. 1), as a result of an electrical circuit which includes the positive side of the line, the brush 47, contact C0, rectifier RX5, contacts R14—R15, the line L6, the line S4 (Fig. 1), the stepper coil C, and the negative side of the line.

The coil CC of the relay C will then be energized in the previously described manner.

The coil CE of the relay E will also be energized as previously described.

The relay E will be made inoperative since an electrical circuit will be established through its neutralizing coil RN by way of plus side of the line, contact C0, coil RN, contacts E1—E2, and the negative side of a source of electrical energy. Then the contacts of relay R will assume the initial position shown in Figure 5 so that the arm 46 can move clockwise in the previously described manner.

It is apparent from the above that as a result of the described operations the arm 46 will be stepped clockwise 10 times and then it reverses its direction of movement so that it will be stepped counter-clockwise 10 times whereupon its direction of movement is again reversed. For every 10 steps, one impulse will be transmitted to the stepper coil C of the indicator of Figure 1 so that the hand 2 of this indicator will be moved counter-clockwise one step.

It is apparent that these impulses represent the allowable percentage of rejects which in the example set forth amounts to 10%. It is apparent that if the allowable percentage of rejects is 5 then it will be necessary for the arm 46 to be stepped 20 times before its direction of movement is reversed and one impulse will be transmitted to the coil C of Figure 1 for every 20 steps or for every 20 production units brought for inspection.

Assuming that upon completion of the inspection of 100 units 15 units have been rejected as not meeting test specifications and further assuming that the allowable rejects schedule is 10%, then the following equations must be considered:

$$SD = AS - (AP \times UI)$$
$$SD = 15 - (.10 \times 100) = +5$$

In other words, when fifteen impulses were emitted by the contacts J1—J2, ten impulses were emitted by the unit of Figure 5. The difference between these impulses amounting to five impulses indicates that the impulses transmitted to the coil ST exceed by five the number of impulses transmitted to the coil C, with the result that the hand 2 was moved five steps clockwise to indicate that the rejects schedule has been exceeded by five units, so that corrective measures must be taken.

It is apparent that while the apparatus of Figures 5 and 6 has been described in conjunction with the rejects schedule, it may be used in all instances where an article or product which is being produced is to be measured in percentages of another article, product, or the like.

The indicator of Figure 7 may be applied when the computing and indicating system is being used to represent the "off-schedule" time of a train; for example, where a train may be behind its regular schedule by many hours.

Figure 7 shows an indicator 74 having a "behind schedule" portion 75 and an "ahead schedule" portion 76. The apparatus also includes a second dial 87 having a "behind schedule" scale and an "ahead schedule" scale.

The indicator includes a hand $2^1$ which is movable along with a gear wheel 79. The gear 79 meshed with a gear 80 which is connected with a gear box 81. A hand 82 connected to the gear box 81 is movable over the dial 87. Due to this arrangement the motion of the hand $2^1$ is transmitted to the hand 82, and the gear box 81 is used to cause the hand 82 to move in the same direction as hand $2^1$. The ratio of all the gears is such that when the hand $2^1$ has completed one revolution, the hand 82 has moved one division or one scale unit upon the dial 87. In the example illustrated, the scales 75 and 76 are calibrated in minutes while the dial 87 is calibrated in hours, and divisions up to three hours may be read directly upon the scale. It is apparent that this calibration may be changed at will.

When the hand $2^1$ is moved counter-clockwise, to indicate that a train is behind schedule, the brush $11^{11}$ engages the segment 90, with the result that the lamp 77 is illuminated by a circuit which includes the plus side of a power source, the brush 83, the segment 84, the brush $11^{11}$, the segment 90, lamp 77, and the negative side of the power source. The lamp is so located that only the scale 75 will be illuminated by it and will be visible to an observer. When the hand $2^1$ is moved clockwise, the brush $11^{11}$ will move in contact with the segment 89 and then the lamp 78 will be illuminated by a similar circuit. The lamp 78 is placed to illuminate only the scale 76. It is apparent that the lamp 77 may be red in color while the lamp 78 may be green.

The segment 90 is connected in parallel with the segment 85 and is of such length that the brush 83 may come in contact with the segment 85 whereupon the brush $11^{11}$ is deenergized as the brush 83 leaves the segment 84. The purpose of this arrangement is to provide a construction wherein if the hand $2^1$ is moved counterclockwise to a point where the brush $11^{11}$ comes in contact with the segment 89, it will not energize the lamp 78 used to illuminate the "ahead of schedule" scale.

The segment 89 is connected in parallel with the segment 86 and operates in the same manner as the segment 90 except that the device is operable when used to indicate the "ahead of schedule" scale.

A somewhat different indicator actuating unit is illustrated in Figure 8. This device may also be used to receive impulses produced by the actual schedule and impulses produced by the pre-set schedule so as to give the resultant deviations directly. In the example illustrated, the impulses due to the actual schedule are used to actuate the stepper coil $ST^1$ by way of the line $S5^1$ and to actuate pawl $7^1$ which in its turn engages the stepper ratchet 61, thereby moving the shaft $61^1$ in the direction illustrated.

The impulses due to the pre-set schedule are used to energize the coil $C^1$ by way of the line $S4^1$ and to actuate the pawl $4^1$ which in its turn engages the stepper ratchet 62 to move the shaft $62^1$ in the direction opposite from that of the shaft $61^1$. The shaft $61^1$ is connected to a gear 63 which is connected to the gear 65. The shaft $62^1$ is connected to a gear 64 which is connected to the gear 66 of the differential gear unit 73. The differential gear unit 73 includes the gear 65 which is firmly connected to a miter gear 67 while the gear 66 is firmly connected to a miter gear 68. The miter gear 69 which rides on the miter gears 67 and 68 is connected to the shaft 71 so that it can rotate about an axis designated by the line $y—y$ in Figure 8. The shaft 71 is firmly connected to the shaft 70 by means of a pin 72, and a hand $2^{11}$ is connected to shaft 70.

When the impulses produced by the actual schedule and the pre-set schedule are balanced, the gears 67 and 68 rotate at the same rate but in opposite directions so that the entire gear 69 will rotate about the axis $y—y$ but will not rotate about the axis $x—x$. Consequently, the hand $2^{11}$ will not move.

Let it be assumed, however that the series of impulses due to the actual schedule exceed the series of impulses due to the pre-set schedule. Then the gear 67 will rotate faster than the gear 68, the difference between the speeds being equal to the difference between the two series of impulses. Then the gear 69 will rotate not only about the axis $y$—$y$ but it will also move the shaft 71 about the axis $x$—$x$. The result is that the shaft 70, with the hand $2^{11}$, will be rotated clockwise a number of steps equal to the difference between the actual schedule and the pre-set schedule series of impulses.

When the impulses due to the pre-set schedule exceed the impulses due to the actual schedule, the gear 68 will rotate faster than the gear 67 and then the hand $2^{11}$ will move counterclockwise a number of steps which is equal to the difference between the two schedules.

Figures 9 and 10 show a modification wherein a perforated tape unit is used for producing the impulses. The use of a perforated tape is advisable when the pre-set production schedule is not uniform but varies during the day. The use of a tape is always advisable when the pre-set schedule consists of a time table or the like. The perforated tape 80 which is shown in detail in Figure 10 is actuated by a clock similar to the clock 33 of Figure 3. The shaft 84 shown in Figure 9 may then be conveniently connected to the clock-carrying shaft 34 of Figure 3. As shown in Figure 9, the shaft 84 drives a sprocket wheel 83 which has projections engaging the holes 87 of the tape 80 (Fig. 10). The tape 80 unreels from a reel 81 and is wound upon a reel 82, shown in Figure 9.

The perforations 88 upon the tape 80 are arranged in accordance with a predetermined production schedule.

The operation of the device is apparent from the above. The tape 80 is moved by the sprocket wheel 83 between the conducting rings 85 and 86. As soon as a perforation 88 has moved between the two rings 85 and 86, an electrical circuit will be established including a positive side of a power source, rings 85 and 86, the line $S6^1$, the line $S4$ which is connected to the line $S6^1$, the stepper coil C of the apparatus shown in Figure 1, and back to the negative side of the power source. Consequently an electrical impulse will be emitted to the stepper coil C, and the hand 2 of the indicator shown in Figure 1 will be moved stepwise.

Figure 12:
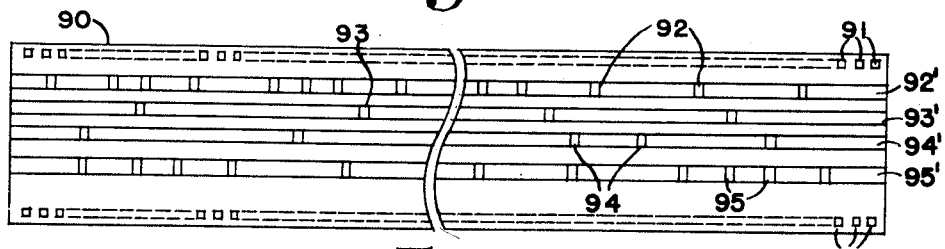
Figure 12 is a top view of the tape used in the apparatus shown in Figure 11.
Figure 13:
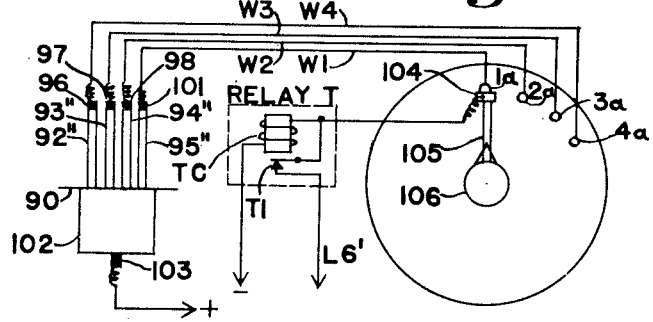
Figure 13 is a diagrammatic sectional view along the line 13—13 of Figure 11.

The device shown in Figures 11, 12 and 13 is used when a pre-set reject schedule varies in accordance with the probability curve and where a product is inspected for more than one characteristic as it proceeds along the inspection line. In other words, this apparatus may be used when a single article or device is examined as to various characteristics such as improper dimensions, improper color, improper construction, and so forth. Furthermore, the device might be used when different percentages of rejects are to be considered, for example, a device may take into consideration the fact that for the first 300 units manufactured the acceptable reject percentage should be, say, 10%, while thereafter the acceptable reject percentage should be 8%, and so forth. For a compound reject characteristic of this nature it is advisable to employ a tape system provided with a tape 90, shown in Figure 12. This tape 90 in the example illustrated comprises four rows, $92^1$, $93^1$, $94^1$, and $95^1$ of perforations 92, 93, 94, and 95. As already stated, each row may represent the normally expected number of rejects due to a specific characteristic.

The perforations 94—95 are disposed along the tape 90 according to the probability occurrence for each characteristic which is being inspected. As is apparent in Figure 12, the perforations 92 in a section of the row $92^1$ may be located closer together than in another section of the row $92^1$, following the probability curve.

As shown in Figure 11, the tape 90 is wound upon the reel 98 and is being unwound from the reel 97 by means of a sprocket wheel 96 which engages the sprocket perforations 91 of the tape 90 (Fig. 12).

The sprocket wheel 96 is connected to a stepping ratchet 99 which is moved stepwise when it is engaged by the stepper arm 100. The stepper arm 100 is actuated by stepper coil CT which is connected to the contacts K1 and K2, shown in Figure 5. As already stated, the contacts K1 and K2 are closed momentarily each time that a unit of production or an article is brought on the inspection line. Thus the stepper coil CT will be energized and will cause a stepwise movement of the sprocket 96 each time the contacts K1 and K2 are closed.

As shown in Figure 13, the tape 90 passes over a conducting ring 102 which is engaged by a brush 103. Thin rings $92^{11}$, $93^{11}$, $94^{11}$ and $95^{11}$ are located on the tape 90 and are arranged above the perforation rows $92^1$, $93^1$, $94^1$, and $95^1$, respectively. The rings $92^{11}$ to $95^{11}$ are engaged by brushes 96, 97, 98, and 101, respectively. Conduits W1, W2, W3, and W4 connect the brushes 96, 97, 98, and 101 to contacts $1a$, $2a$, $3a$, and $4a$. These contacts are arranged circularly upon a dial and may be engaged by a brush 104 carried upon an arm 105.

The brush 103, engaging sleeve 102, is connected to the positive side of a source of electrical energy. The brush 104 is connected to the energizing coil TC of a relay T. An indicator 106 may be firmly connected to the arm 105. It is apparent that the arm 105 and the contacts engaged thereby constitute a schedule selector.

The coil TC of the relay T is connected to the negative side of a source of electrical energy and is also connected to contacts T1 which are connected to a conduit $L6^1$.

The device is operated as follows:

Let it be assumed that at a certain location on an inspection line a product is being inspected for a characteristic whose reject probability is represented by perforations 92 located upon the row 92 of the tape 90. Then the operator turns the schedule selector arm 105 so that the brush 104 will be moved in contact with the contact $4a$. As each unit is brought upon the inspection line, the contacts K1 and K2 will be actuated and the stepper 96 will move stepwise the tape 90. As soon as one of the perforations 92 is moved between the sleeve 102 and the ring $92^{11}$, a circuit will be established which will include the positive side of a power supply, the brush 103, ring 102, ring $92^{11}$, brush 96, line W4, contact $4a$, brush 104, contacts T1 of the relay T, the line $L6^1$ which is connected to the line $S4$ of Figure 1, the coil C of Figure 1, and back to the negative side of the power supply. Thus the coil will be momentarily energized and the hand 2 of the apparatus of Figure 1 will be moved one step counter-clockwise.

The relay T of Figure 13 has a slight pick-up lag so that it picks up only after the hand 2 of the apparatus shown in Figure 1 has been moved one step. As soon as the relay T is operated by its coil TC, the contacts T1 will open and the circuit to the coil C of Figure 1 will be interrupted. The circuit will remain interrupted until the next perforation 92 is moved between the sleeve 102 and the ring $92^{11}$. Then another short impulse will be emitted to the stepper coil C of Figure 1.

It is apparent that the arrangement of perforations upon each line may be varied at will, depending upon any selected variable characteristics. As soon as the units have been examined according to one characteristic, the operator will energize another row by turning the arm 165 and thereby make it possible to indicate rejects according to another characteristic.

It is apparent that the examples shown above were given solely by way of illustration and not by way of limitation, and they are subject to many variations and modifications without exceeding the scope of the present invention. All such variations and modifications are to be included within the scope of the present invention.

What is claimed is:

1. In a computing and indicating system, the combination of a single indicator for showing the difference between a series of actual occurrences and a theoretical schedule, a mechanism for step-wise actuating said indicator in one direction, a mechanism for step-wise actuating said indicator in the opposite direction, and means connected with one of said mechanisms for transmitting thereto electrical impulses variable in accordance with said series of actual occurrences; a schedule selector comprising an oscillatable arm, contacts engaged by said oscillatable arm in its two end positions, and means varying the relative positions of said contacts; means uniformly actuating said oscillatable arm, means reversing the movement of said oscillatable arm when it reaches any one of said end positions, and means transmitting an electrical impulse to the other one of said mechanisms when said arm is in any one of said end positions, whereby the last-mentioned impulses are transmitted according to an adjustable theoretical schedule.

2. In a computing and indicating system, the combination of a single indicator for showing the difference between a series of actual occurrences and a theoretical schedule, means transmitting to said indicator electrical impulses variable in accordance with said series of actual occurrences; a schedule selector comprising an oscillatable arm and means varying the amplitude of oscillations of said arm, means uniformly oscillating said arm, and means connected with the last-mentioned means, said indicator and said selector for transmitting an electrical impulse to said indicator whenever the direction of movement of said oscillatable arm is reversed, whereby the last-mentioned impulses are transmitted according the said theoretical schedule.

3. In a computing and indicating system, a schedule selector for emitting a uniform series of electrical impulses representing a theoretical schedule, said selector comprising two contacts, means varying the relative positions of said contacts, an arm oscillatable between said contacts, means uniformly moving said arm from any one of said contacts to the other, a relay connected with said means for reversing the movement of said arm when it reaches any one of said contacts, and means connected with said contacts and said relay for emitting an impulse when said arm reaches any one of said contacts.

4. In a computing and indicating system, a schedule selector for emitting a uniform series of electrical impulses representing a theoretical schedule, said selector comprising a scale, a contact fixed relatively to said scale, another contact movable to a selected position upon said scale, an arm oscillatable between said contacts, a conducting brush carried by said arm and adapted to engage said contacts, gears moving said arm in opposite directions, magnetic clutches connected with said gears, a clock mechanism connected with one of said clutches, a relay connected with said clutches and said contacts for alternately operating said clutches, and means connected with said contacts and said relay for emitting an impulse when said arm reaches any one of said contacts.

5. In a computing and indicating system, a schedule selector for emitting a uniform series of electrical impulses representing a theoretical schedule, said selector comprising a scale, a contact fixed relatively to said scale, another contact movable to a selected position upon said scale, an arm oscillatable between said contacts, a conducting brush carried by said arm and adapted to engage said contacts, a shaft carrying said arm, a gear upon said shaft, said gear being rotatable along with said shaft and said arm, two gears meshing with the first-mentioned gear, separate magnetic clutches connected with the two last-mentioned gears, two intermeshing gears connected with said clutches, a clock mechanism connected with one of said two intermeshing gears, a relay connected with said clutches and said contacts for alternately engaging and disengaging said clutches, and means connected with said contacts and said relay for emitting an impulse when said arm reaches any one of said contacts.

6. A schedule selector according to claim 5, comprising a pair of contacts, a make-and-break mechanism actuating the last-mentioned contacts and actuated by said clock mechanism, impulse-emitting means connected to the last-mentioned contacts, and speedometer-actuated means connected to the other one of the two intermeshing gears.

7. A schedule selector according to claim 5, comprising an elongated tape having perforations formed therein and disposed along the length of the tape in accordance with a theoretical schedule, means actuated by said clock mechanism for moving said tape, contacts located on opposite sides of said tape and adapted to be short-circuited when one of said perforations is moved between them, and impulse-emitting means connected with the last-mentioned contacts and actuated when the last-mentioned contacts are short-circuited.

8. In a computing and indicating system, the combination of a schedule selector for emitting a uniform series of electrical impulses representing a theoretical schedule, said selector comprising two contacts, means varying the relative positions of said contacts, an arm oscillatable between said contacts, gears moving said arm in opposite directions, magnetic clutches connected with said gears, and a clock mechanism connected with one of said clutches; with a clutch-and stepper coil-actuating relay, a control relay, the first-mentioned relay comprising an energizing coil connected with one of the selector contacts and one of said clutches, a de-energizing coil connected with the other one of said clutches, contacts connected with said other clutch to energize it when said arm is in engagement with one of the selector contacts, contacts connected with said selector contacts and emitting an impulse when said arm is in engagement with any one of said selector contacts, contacts connected with said energizing coil for maintaining it energized after said other clutch is de-energized; the second-mentioned relay comprising a coil connected with the impulse-emitting contacts of the first-mentioned relay, and contacts connected with the clutch-energizing contacts of the first-mentioned relay, and means supplying electrical current to the selector contacts and the two relays, whereby the first-mentioned relay operates the two clutches and transmits said impulses while the second-mentioned relay retards the actuation of the first-mentioned relay.

9. In a computing and indicating system, in combination with an indicator operated by the difference between a first and second series of electrical impulses to show deviations from a reject percentage, a device connected with said indicator for transmitting thereto a first series of electrical impulses corresponding to the number of actual rejects, a counter of inspected units, a stepper, means connecting said counter with said stepper for moving said stepper stepwise in any one of two opposite directions whenever said counter is actuated, a schedule selector comprising means for setting it manually to a selected reject percentage, means connecting said stepper with said schedule selector for reversing the direction of movement of said stepper when the stepper was moved a number of steps corresponding to the number of the selected reject percentage, and impulse-transmitting means connecting the last-mentioned means with said indicator and actuated when the direction of movement of said stepper is reversed for transmitting the second series of electrical impulses to said indicator.

10. In a computing and indicating system, in combination with a schedule selector comprising a plurality of contacts disposed to indicate a number of reject percentages, said contacts including a zero contact, a movable arm and a brush carried by said arm and adapted to engage any one of said contacts to indicate a selected reject percentage, a counter of inspected units, a stepper comprising a gear wheel, means moving said gear wheel stepwise in one direction, means moving said gear wheel stepwise in the opposite direction, an arm, a plurality of contacts, the second-mentioned contacts including a zero contact, and a brush carried by the last-mentioned arm and adapted to engage any one of the last-mentioned contacts, the last-mentioned contacts being located in relation to each other at distances from their zero contact corresponding to numbers of steps equal to said numbers of reject percentages, a separate wire connecting each of the first-mentioned contacts to a separate second-mentioned contact, any first-mentioned contact representing a certain number of reject percentages being connected to a second-mentioned contact located the same number of steps from the zero contact, means connecting said counter selectively with one of the two wheel-moving means for actuating them whenever said counter is actuated, means connected with the last-mentioned means for disengaging said counter from one of the wheel-moving means and connecting it to the other wheel-moving means when the second-mentioned brush is moved into engagement with the second-mentioned contact connected to that first-mentioned contact which is engaged by the first-mentioned brush, and impulse-emitting means connected with said contacts and actuated when engagements of the second-mentioned brush with the aforesaid second-mentioned contact and with the second-mentioned zero contact take place.

11. In a computing and indicating system having a percentage selector, an impulse transmitter and a counter of examined units, an oscillator comprising a zero contact and a plurality of other contacts, each of said other oscillator contacts being connected with said percentage selector and adapted to be selected by said percentage selector, an arm, means connected with said arm for stepwise oscillating the same between said oscillator zero contact and the selected oscillator contact, a relay comprising contacts connected with the oscillator contacts and said impulse transmitter for transmitting impulses when said arm engages any one of the oscillator contacts, and contacts connected with said counter of examined units, and means connected with the last-mentioned contacts and the first-mentioned means for moving said arm stepwise when said counter of examined units is actuated and for reversing the direction of this movement after the arm reaches the selected oscillator contact.

12. In a computing and indicating system having a percentage selector, an impulse transmitter and a counter of examined units, an oscillator comprising a zero contact and a plurality of other contacts, each of said other oscillator contacts being connected with said percentage selector and adapted to be selected by said percentage selector, an arm, means connected with said arm for stepwise oscillating the same between said oscillator zero contact and the selected oscillator contact, and three relays, the first relay comprising contacts connected with the oscillator contacts and said impulse transmitter for transmitting impulses when said arm engages any one of the oscillator contacts, and contacts connected with said counter of examined units, the second relay comprising contact means connected with the last-mentioned contacts of the first relay and with the first-mentioned means for moving said arm stepwise when said counter of examined units is actuated and for reversing the direction of this movement after the arm reaches the selected oscillator contact, and when said counter of examined units is open, the third relay having contact means connected with the first-mentioned contacts of the first relay for maintaining the first relay energized while impulses are being transmitted to said impulse transmitter.

13. In a computing and indicating system, a single indicator for showing the difference between a series of actual occurrences and a theoretical schedule, said indicator comprising, in combination, two concentrically disposed scales, a single hand movable back and forth over said scales, a gear wheel connected with said hand and rotatable therewith, another scale calibrated in larger units than said concentrical scales, a gear mechanism connecting said gear wheel with the second-mentioned hand for moving the second-mentioned hand one step after the first-mentioned hand completed one revolution, and means connected with the first-mentioned hand for illuminating one of the two concentrical scales when the first-mentioned hand has moved in one direction beyond a zero position upon the two concentrical scales, and for illuminating the other one of the two concentrical scales when the first-mentioned hand has moved in the opposite direction beyond said zero position.

14. In a computing and indicating system, the combination of a single indicator for showing the difference between a series of actual occurrences and a theoretical schedule, a mechanism for stepwise actuating said indicator in one direction, a mechanism for stepwise actuating said indicator in the opposite direction, and means connected with one of said mechanisms for transmitting thereto electrical impulses variable in accordance with said series of actual occurrences; a compound rejects selector comprising an elongated tape having a plurality of rows of perforations formed therein and disposed along the length of the tape in accordance with several different reject characteristics, means for stepwise moving said tape each time a unit is inspected, separate contacts engaging each of said rows of perforations, means selectively energizing contacts engaging any of said rows and means transmitting an electrical impulse to the other one of said mechanisms when said tape is moved to bring a perforation in engagement with the energized contacts, whereby the last-mentioned impulses are transmitted according to an adjustable theoretical schedule.

15. In a computing and indicating system, a compound rejects selector comprising an elongated tape having a plurality of rows of perforations formed therein and disposed along the length of the tape in accordance with several different reject characteristics, a sprocket wheel engaging said tape for moving the same, means actuating said sprocket wheel each time a unit is inspected, a conducting sleeve engaging one side of said tape, separate rings located on opposite sides of said tape over said rows and adapted to engage said sleeve through said perforations, a schedule selector having a plurality of contacts, each of said contacts being connected with a separate ring, an arm movable over said contacts, a relay connected with said arm, and impulse-transmitting means connected with said relay and energized when a perforation is in contact with that ring which is connected with the contact engaged by said arm.

References Cited in the file of this patent
UNITED STATES PATENTS

| Number | Name | Date |
|---|---|---|
| 45,157 | Hoffman | Nov. 22, 1864 |
| 1,214,540 | Greene | Feb. 6, 1917 |
| 1,377,844 | McCutchen et al. | May 10, 1921 |
| 2,283,993 | Holz et al. | May 26, 1942 |
| 2,302,081 | Weitmann | Nov. 17, 1942 |
| 2,333,758 | Zenia et al. | Nov. 9, 1943 |
| 2,569,840 | Whalen et al. | Oct. 2, 1951 |

FOREIGN PATENTS

| Number | Country | Date |
|---|---|---|
| 435,624 | Great Britain | Sept. 25, 1935 |